United States Patent

[11] 3,593,390

| [72] | Inventor | Michel Pettigrew |
| | | Forest Hall, Deep River, Ontario, Canada |
| [21] | Appl. No. | 734,034 |
| [22] | Filed | June 3, 1968 |
| [45] | Patented | July 20, 1971 |
| [73] | Assignee | Atomic Energy of Canada Limited |
| | | Ottawa, Ontario, Canada |

[54] SELF-LOCKING WEDGE RING SUPPORT
2 Claims, 8 Drawing Figs.

[52] U.S. Cl. ................................ 24/263,
138/148, 287/52.03, 204/193.2
[51] Int. Cl. ...................................... F16d 1/06
[50] Field of Search ........................... 24/263.5;
287/52.03; 294/86, 90, 96, 102 A; 138/148,
112—114

[56] References Cited
UNITED STATES PATENTS

| 758,549 | 4/1904 | Melius | 287/52.03 X |
| 1,201,706 | 10/1916 | Dodge | 287/52.03 X |
| 2,868,564 | 1/1959 | Arras | 24/263.5 UX |
| 2,945,720 | 7/1960 | Osmun | 24/263.5 T UX |
| 3,040,405 | 6/1962 | Solum | 24/263.5 |
| 3,106,520 | 10/1963 | Wolfe et al. | 138/148 |
| 3,126,918 | 3/1964 | Eaton | 138/113 |

*Primary Examiner*—Donald A. Griffin
*Attorney*—Seidel and Gonda

ABSTRACT: A self-locking wedge ring assembly supporting a spacer element on a tube or on an inner one of a pair of concentric tubes such as the pressure tube of a nuclear reactor. The wedge ring assembly includes inner and outer rings having mating tapered surfaces, the inner ring being split to allow for diametrical variations of the pressure tube.

PATENTED JUL20 1971

SELF-LOCKING WEDGE RING SUPPORT

This invention relates to annular support members and, more particularly, to a self-locking wedge ring for use on a rod or tube. The wedge ring is particularly suitable for use as a support for a spacer element positioned between concentric tubes of a nuclear reactor.

An example of a spacer element is disclosed in U. S. Pat. No. 3,106,520, and comprises an endless coil spring, sometimes referred to in the art as a "garter spring."

The garter spring provides an annular space between a calandria tube and a pressure tube mounted therein, so as to allow relative axial movement of the tubes and permit the passage of cooling and purging gases between the tubes.

For certain applications such as nuclear reactors, it is considered desirable to have a support for a spacer element, of the like, which would not produce metalurgical interference as would be the case if a support ring were to be welded on to the pressure tube. An external ring machined on the pressure tube was considered. However, such an integrally formed ring would not be economical.

A self-locking-type wedge appeared to provide the required characteristics. However, known locking rings either required a groove in the tubular member, or were effective in only one axial direction. A further problem was that of providing a ring which would allow for diametrical variations in the pressure tube.

It is, therefore, an object of the present invention to provide a self-locking wedge ring assembly which resists axial movement, when subjected to loading in either direction.

A further object of the present invention is the provision of a self-locking wedge ring assembly having means to allow for diametrical adjustment, if required, due to slight variation in tube diameter.

A further object of the invention is the provision of an annular support member which minimizes metalurgical interference with the tube.

A still further object of the invention is the provision of an annular support which fits in a confined annular space.

SUMMARY OF INVENTION

A self-locking wedge ring assembly, including an inner ring split in one or several circumferential locations to provide diametrical adjustments, and an outer endless ring held firmly on a tube or shaft by the wedging action of cooperating tapered surfaces of the inner and outer ring.

In the drawings which illustrate an embodiment of the invention,

Figure 1:
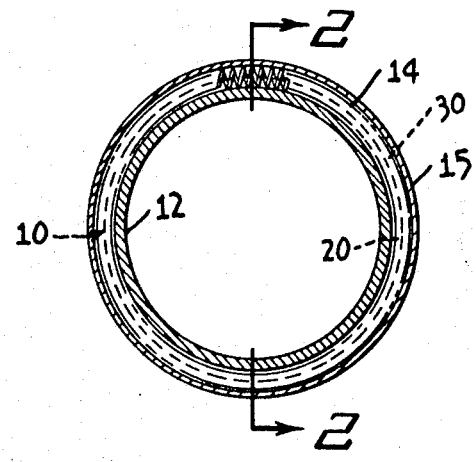
FIG. 1 is a top plan sectional view of a wedge ring assembly in accordance with this invention in place on the inner tube of a concentric tube structure and showing, in addition, portions of a spring-type spacer element supported by the ring.
Figure 2:
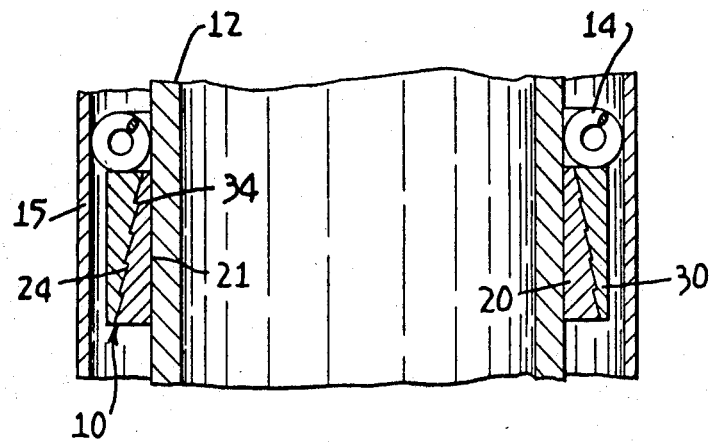
FIG. 2 is a sectional view taken along the lines 22 of FIG. 1.
Figure 3:
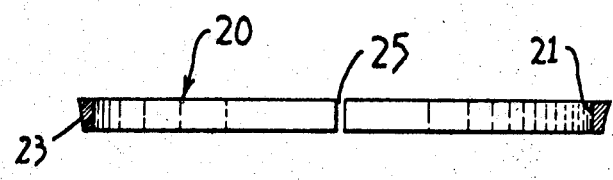
FIG. 3 is a sectional view of the inner ring of the wedge assembly of FIGS. 1 and 2.
Figure 4:
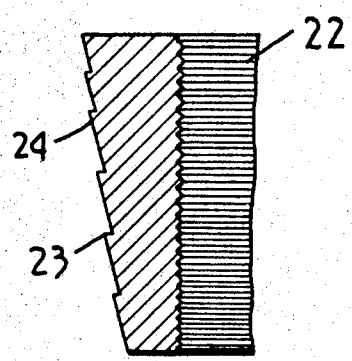
FIG. 4 is an enlarged view of a portion of a ring similar to the ring of FIG. 3.
Figure 5:
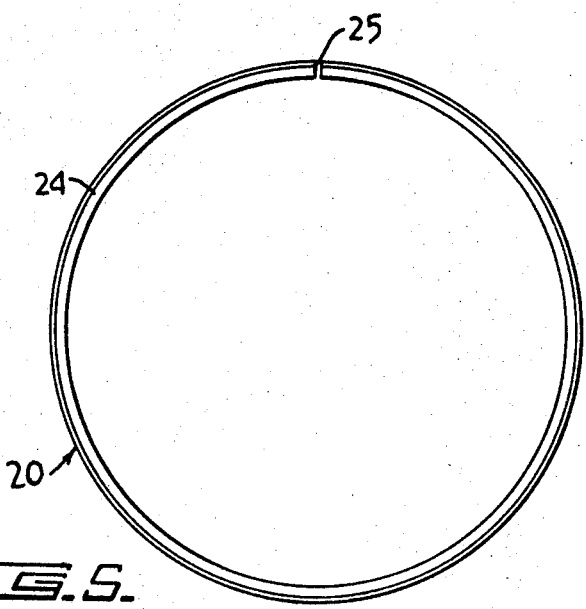
FIG. 5 is a top plan view of the ring of FIG. 3.

Referring now in detail to the drawings, a wedge ring assembly is shown generally at 10 in FIGS. 1 and 2, on a pressure tube 12, supporting a garter spring-type annular spacer 14. The garter spring spaces the pressure 12 within a calandria tube 15 of a nuclear reactor. As shown more clearly in FIGS. 2—8, the wedge ring assembly 10 includes an inner ring 20 formed of a suitable material. Examples of satisfactory materials for use in nuclear reactors are those sold under the trade names "Zircaloy 2" and "Inconel X-750." From the point of view of neutron economy, preferred materials for in-reactor applications are zirconium alloys (such as Zircaloy-2, Zircaloy-4 and zirconium-niobium alloy, etc.) and aluminum alloys. However, the wedge ring may be used for other applications such as tube or pipe supports, where steels or stainless steels would be suitable.

The inner ring 20 has a substantially cylindrical inner wall 21. An inner ring 20a (shown in FIG. 4) is similar to ring 20, with the exception that it is provided with annular serrations 22. An outer wall 23 of the ring 20 has a taper of approximately 4° relative to the inner wall 21. The outer wall 23 is also provided with annular grooves which form saw teeth 24 extending therearound. It will be noted that the ring 20 has a slit 25 to provide for expansion and contraction of the ring to accommodate slight variations in the diameters of the pressure tubes on which it will be used.

Figure 6:
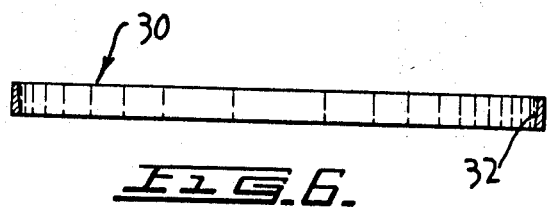
FIG. 6 is a sectional view of the outer ring of the wedge ring assembly of FIG. 2.
Figure 7:
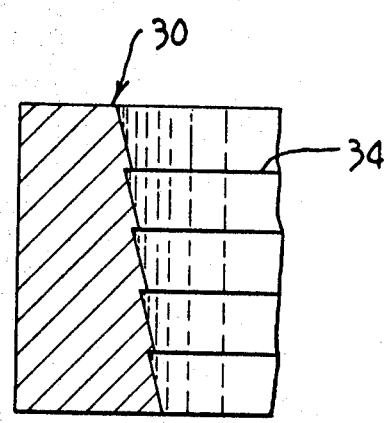
FIG. 7 is an enlarged sectional view of a portion of the ring of FIG. 6.
Figure 8:
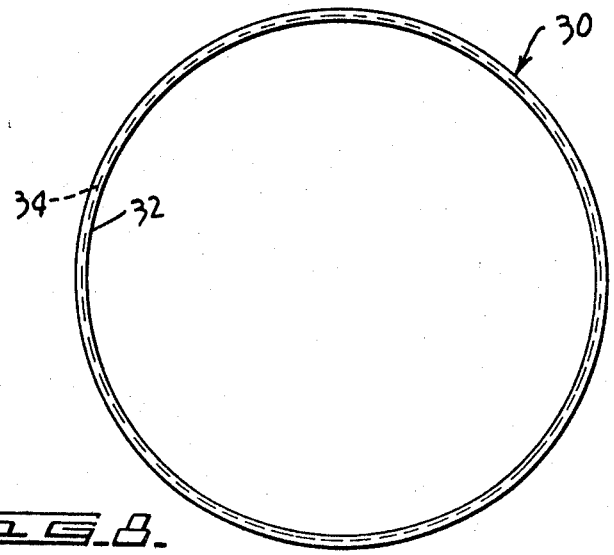
FIG. 8 is a top plan view of the outer ring of FIG. 6.

The wedge ring assembly 10 also includes an outer ring 30 shown more clearly in FIGS. 6, 7 and 8. The ring 30 is made of the same material as the inner ring 20 but, unlike ring 20, no slit is provided. It will be noted that the ring 30 has a tapered inner wall 32 provided with teeth 34, adapted to mate with the teeth 24 of the inner ring 20. In the embodiment illustrated in the drawings, the ring 30 also has a preferred taper of approximately 4°.

Tests were carried out on wedge rings with 4° and 8° taper. Angles of taper as high as 20° are practically feasible and may be advantageous in certain cases to accommodate large diametrical variations. A reasonable range of angles is considered to be 2° to 20°.

To assemble the wedge rings on the tube 12, the inner ring 20 and outer ring 30 are slid together until all or most of the teeth 24 and 34 are engaged (see FIG. 2). The assembly 10 is held firmly on the tube by the wedging action of the inner ring 20, which is slit to allow for slight variations in the diameters of the tubes. The self-locking feature is provided by the "saw tooth" grooves 24 and 34 machined or otherwise formed in the tapered surfaces of the rings 20 and 30.

The diametrical interference of the assembly 10 is chosen to induce, on the smallest diameter pressure tube, sufficient pressure to prevent sliding. The diametrical interference is greater when the rings 20 and 30 are assembled on a tube 12 of maximum diameter and, in this case, the outer ring 30 tends to expand plastically.

It is believed that when in use in a nuclear reactor, the initial hoop stress in the outer ring 30 will be relaxed by the effect of temperature and neutron flux. After the initial transient period, the wedge ring 30 will creep diametrically at the same rate as the pressure tube 12, because of geometrical conditions. Since equal creep strain rates may only be caused by similar stress states under the same conditions, the hoop stress in the outer wedge ring 30 will be in the same order of magnitude as that of the underlaying pressure tube 12. Hence, there should always be sufficient pressure between the rings 20 and 30 and the tube 12 to prevent sliding or loosening of the wedge ring assembly 10.

In addition, the greater diametrical creep of the pressure tube portion 12 adjacent to the ring assembly will further prevent sliding.

It will be appreciated that teeth similar to the teeth 24 and 34 of the inner ring 20 and outer ring 30 can be provided in the form of continuous spiral similar to thread on a bolt, so that turning one ring relative to the other would aid in separating all rings. It is also contemplated that the teeth on one or other of the rings need not be continuous. Furthermore, discontinuous teeth could be provided on both rings so that, on being turned relative to one another, the teeth would be engaged or disengaged.

I claim:

1. An annular support assembly for use on a tube, said assembly comprising inner and outer interfitting, cooperating rings for encircling said tube, said inner ring being split and having a tapered periphery provided with annular grooves, said annular grooves defining saw-toothed shape ridges, the crests of which lie on said tapered periphery along substantially the entire axial length thereof, said outer ring being endless and having a tapered inner wall and grooves therein to provide ridges adapted to mate with the taper and grooves of said inner ring, whereby said assembled support resists movement in both directions when an axial load is applied from either direction.

2. An annular support assembly as claimed in claim 1 wherein said inner ring has serrations on an inner wall thereof for engaging said tube.